UNITED STATES PATENT OFFICE.

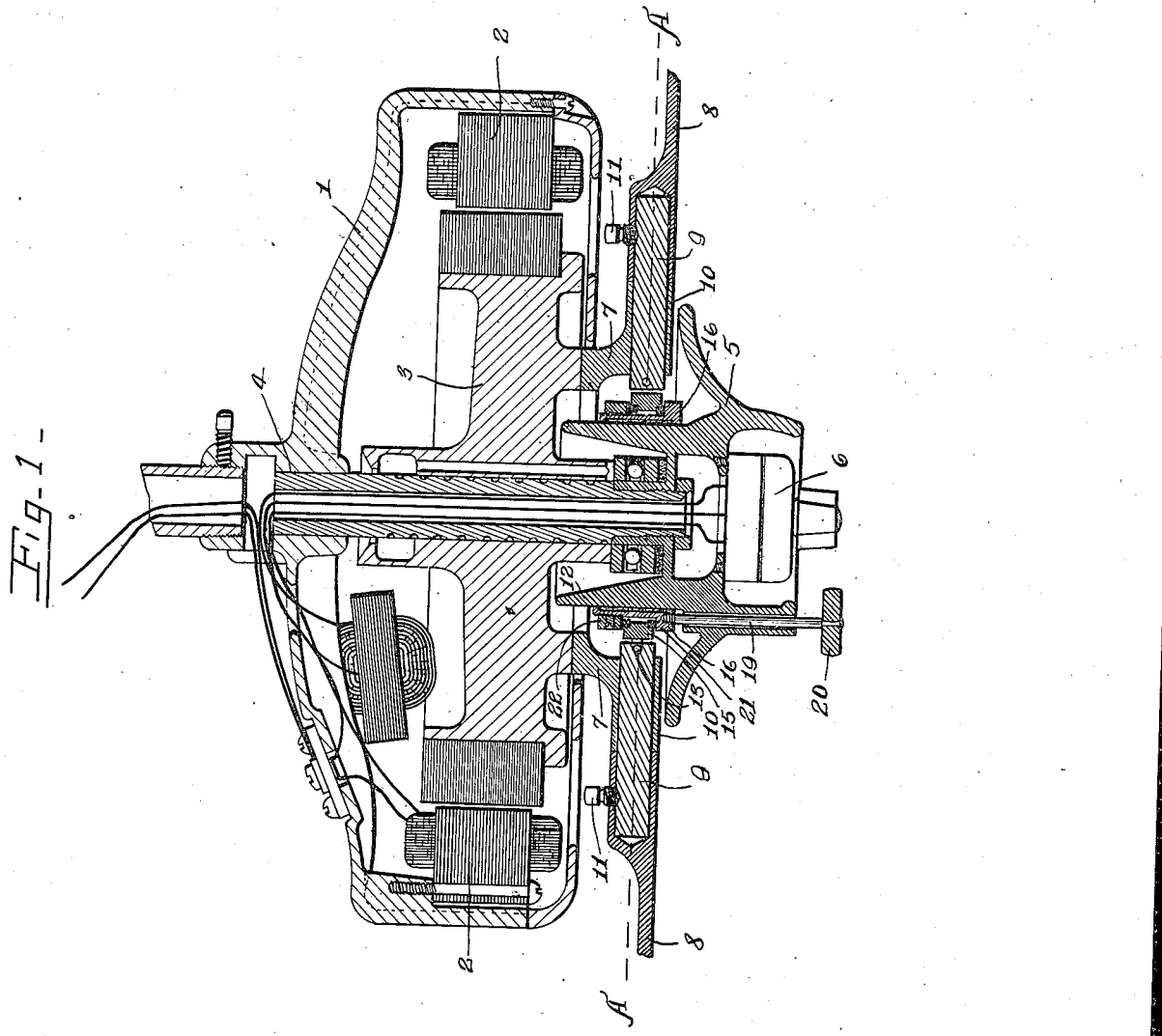

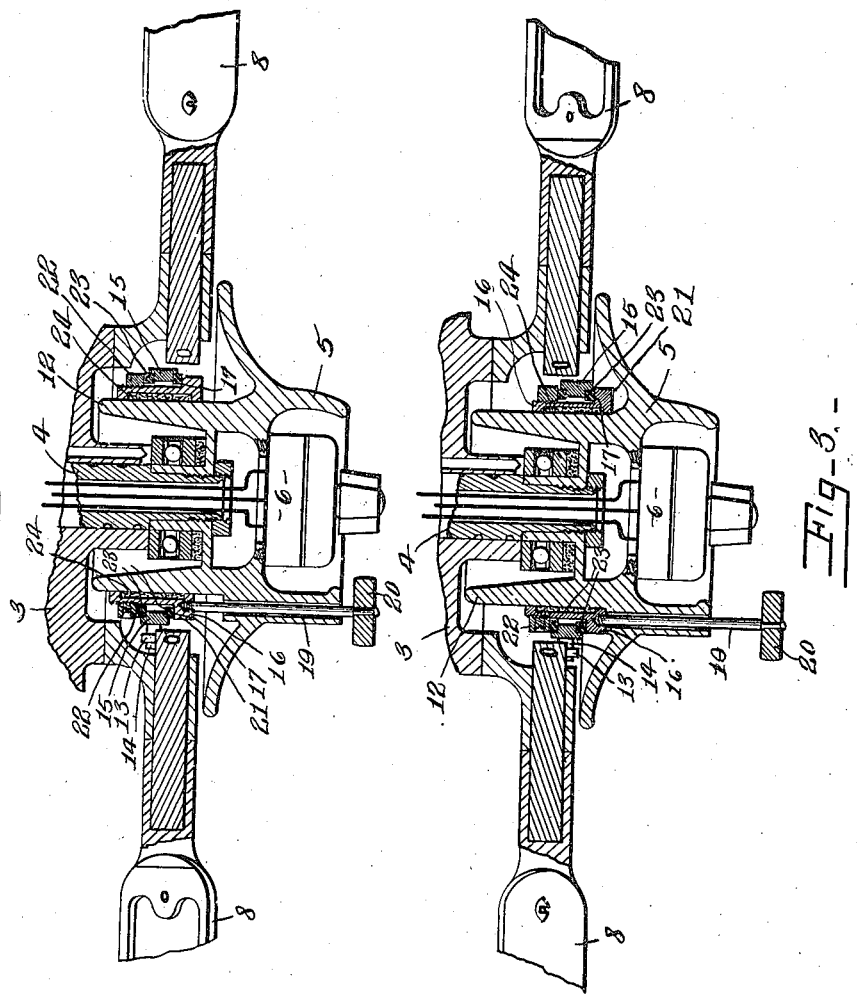

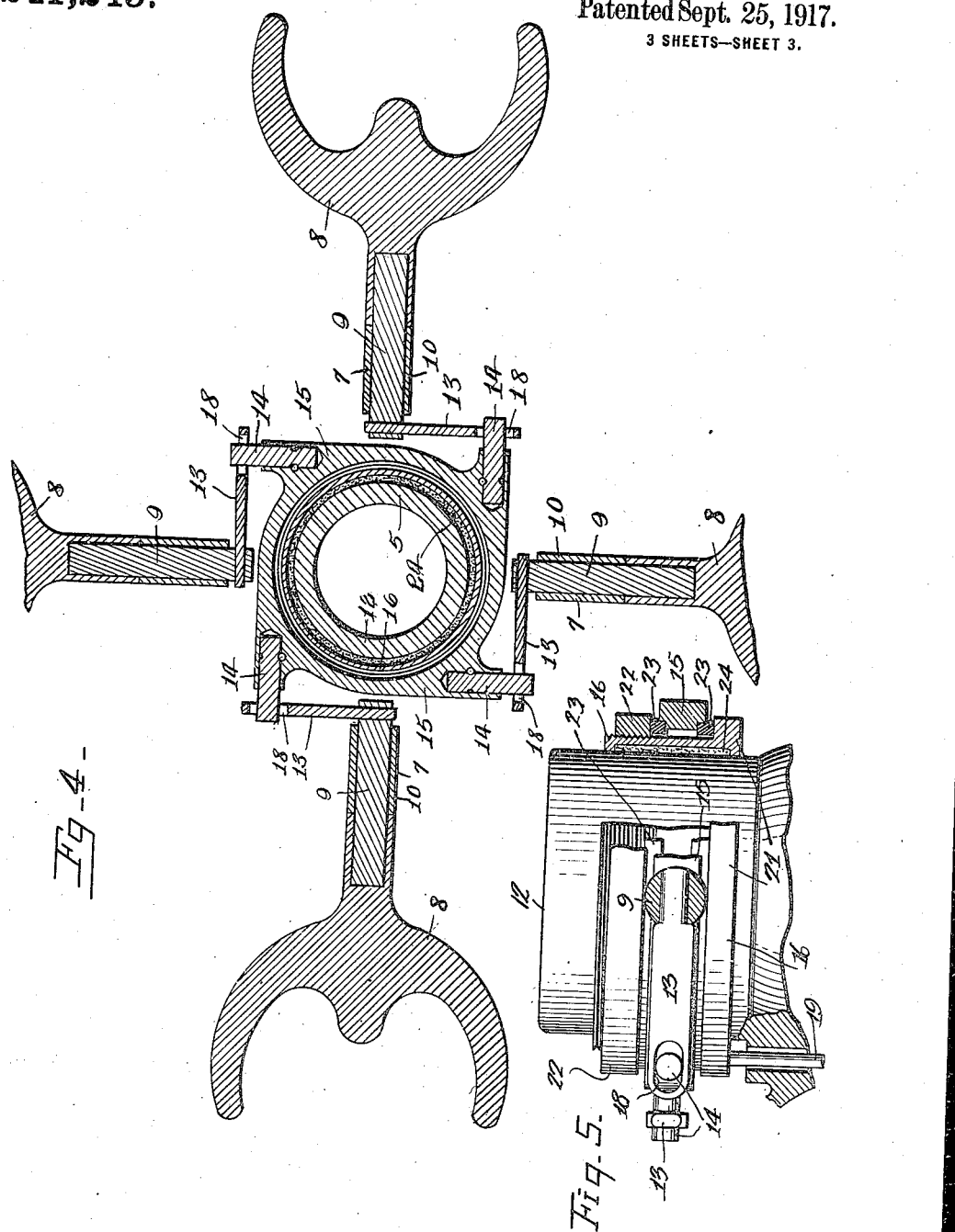

LINUS J. PARKER, OF FULTON, NEW YORK, ASSIGNOR TO HUNTER FAN AND MOTOR CO., OF FULTON, NEW YORK, A CORPORATION OF NEW YORK.

MOTOR-FAN.

1,241,245.             Specification of Letters Patent.      Patented Sept. 25, 1917.

Application filed July 23, 1915. Serial No. 41,539.

*To all whom it may concern:*

Be it known that I, LINUS J. PARKER, a citizen of the United States, residing at Fulton, in the county of Oswego and State of New York, have invented a certain new and useful Motor-Fan, of which the following is a specification.

This invention relates to motor fans and has for its object a particularly simple and efficient means for shifting or changing the angle of the blades or vanes; and it consists in the novel features and in the combinations and constructions hereinafter set forth and claimed.

In describing this invention, reference is had to the accompanying drawings, in which like characters designate corresponding parts in all the views.

Figure 1 is a longitudinal sectional view of this fan, the contiguous part of an electric motor arranged in alinement with the fan being also shown, and the fan vanes being shown as partly broken away.

Fig. 2 is an enlarged sectional view through the fan and contiguous parts, showing the position of the vanes and their shifting mechanism when they are shifted to their extreme angle in one direction.

Fig. 3 is a view similar to Fig. 2 showing the blades as reversed from their position shown in Fig. 2.

Fig. 4 is an enlarged sectional view taken on the plane of line A—A, Fig. 1.

Fig. 5 is a detail view of the detached parts of my invention.

This fan comprises, generally, a carrier, vanes journaled in the carrier, and means for changing the angle of the vanes including a non-rotatable element, and means connecting said element and the vanes to transmit the shifting movement to the vanes during the rotation of the carrier. I have here shown my invention as embodied in a fan driven by an electric motor which is arranged in axial alinement with the fan.

1 designates the casing of the motor, 2 are the field magnets, and 3 is the rotating armature rotatably mounted upon a hollow central stationary shaft 4.

5 is a frame element, as a fixed hub, supported at the lower end of the shaft 4 and carrying a snap switch 6 which controls the actuation of the electric motor, the wires, which are connected to the snap switch, passing through the hollow shaft 4.

The fan includes a carrier 7 and vanes 8 having shanks 9 journaled in suitable bearings 10 associated with the carrier 7. The carrier is arranged concentric with the armature 3 and hub 5 and is suitably secured to the armature to rotate therewith. The shanks 9 are preferably pieces separable from the vanes 8. The shanks extend into sockets formed in the inner ends of the vanes 8 and are held in position by set screws 11. The hub 5 includes a portion 12 which extends coaxially into the carrier 7.

The means for changing the angle of the vanes 8 comprises a non-rotatable element or ring shiftable axially of the portion 12 of the hub 5 and a rotatable element or ring connected to the former element to shift axially therewith and also connected to the shanks 9 of the vanes to rotate the same about their axes during the axial shifting of the said rotatable element.

In this embodiment of my invention, the shanks 9 are provided with cranks 13, and eccentric pins 14 are connected to the cranks and to the rotatable element or shifter or ring 15 rotatably mounted on a non-rotatable element or collar or ring 16 slidable axially of the portion 12 of the hub 5 but non-rotatable thereon, the shifter or ring 15 extending into an annular groove 17 provided in said collar.

As here shown, the pins 14 are fixed in the collar 15 and work in slots 18 in the crank arms 13. The collar 16 is shifted axially of the portion 12 of the hub 5 by means fixed from rotation, as a rod 19 connected to said collar and extending vertically through the passage in the lower portion of the hub 5 and carrying a handle 20 at its lower end. The annular groove 17 of the collar 16 is formed by an integral annular flange 21 at the lower end of said collar and by an adjustable ring 22 threading on the upper end of the collar toward the flange 21.

Suitable packing rings 23 are inserted between the shifter 15 and the walls of the annular groove to prevent rattling and also a packing 24 is inserted between the portion 12 of the hub and collar 16 to prevent rattling. The collar 16 and hence the vanes are held in any adjusted position by reason of the friction between the moving parts, as between the collar 16 and the portion 12 of the hub 5 and between the shanks 9 and their bearings 10. The vanes 8 can be adjusted relatively to the shanks 9 so that all the crank arms 13 and vanes 8 can be adjusted to stand in the same relation, by loosening the set screws 11 and turning the vanes relatively to the shanks and again tightening the set screws.

In operation, if it is desired to vary the air current created by the fan or to change the direction thereof, the operator merely moves the handle 20 upwardly or downwardly in accordance with the change desired in the air current. This movement shifts the collar 16 axially which carries the shifter 15 therewith and in turn moves the eccentric pins 14 to change the angle of the crank arms 13 and hence the vanes 8.

This vane shifting means is particularly advantageous in that it is simple and compact in construction and economical in manufacture.

What I claim is:—

1. A motor fan comprising a rotating carrier, vanes journaled in the carrier, a fixed frame element extending axially into the carrier, and means for shifting the vanes comprising a ring encircling said element and movable axially thereof and connected to the vanes, substantially as and for the purpose described.

2. A motor fan comprising a rotating carrier, vanes journaled in the carrier, a fixed frame element extending axially into the carrier, and means for shifting the vanes comprising a ring encircling said element and movable axially thereof and connected to the vanes, and a part fixed from rotation for moving the ring axially, substantially as and for the purpose specified.

3. A motor fan comprising a frame including a central element, a carrier rotatable about said element, vanes having shanks journaled in the carrier, inner and outer concentric rings encircling said element and shiftable axially thereof, the rings having interlocking means whereby the axial movement of one is transferred to the other, the outer ring being rotatable and connected to the vanes to shift the same during the axial movement of the ring, and means connected to the inner ring to shift the same axially, substantially as and for the purpose set forth.

4. A motor fan comprising a rotating carrier, vanes journaled in the carrier, a fixed element extending axially into the carriage, and means for shifting the vanes comprising a ring encircling said element and movable axially thereof and connected to the vanes, and means fixed from rotation for moving the ring axially, said means being carried by said element and extending lengthwise thereof, substantially as and for the purpose described.

5. A motor fan comprising a frame including a central element, a carrier rotatable about said element, vanes having shanks journaled in the carrier, inner and outer concentric rings encircling said element and shiftable axially thereof, the outer ring being rotatable and connected to the vanes to shift the same during the axial movement of the ring, the rings having interlocking means whereby the axial movement of one is transferred to the other, and an operating member extending lengthwise of said element and connected to the inner ring.

In testimony whereof, I have hereunto signed my name at Fulton, in the county of Oswego and State of New York, this 8th day of June, 1915.

LINUS J. PARKER.